United States Patent [19]

Sasaki et al.

[11] 4,323,592

[45] Apr. 6, 1982

[54] PROCESS FOR PRODUCING A SHAPED ARTICLE HAVING A MAT SURFACE

[76] Inventors: Isao Sasaki, 2-6-206, Kurokawa 3-chome; Kenji Kushi, 2-6-101, Kurokawa 3-chome, both of Ohtake-shi, Hiroshima-ken, Japan

[21] Appl. No.: 150,141

[22] Filed: May 15, 1980

[30] Foreign Application Priority Data

Jun. 21, 1979 [JP] Japan .................................. 54-78378

[51] Int. Cl.$^3$ ............................................... B05D 3/06
[52] U.S. Cl. ................................ 427/54.1; 204/159.16
[58] Field of Search ................... 427/54.1; 204/159.16

[56] References Cited

U.S. PATENT DOCUMENTS

| | | | |
|---|---|---|---|
| 3,759,808 | 9/1973 | Parker et al. | 204/159.23 |
| 3,992,275 | 11/1976 | Shahidi et al. | 204/159.23 |
| 4,197,344 | 4/1980 | Tshudy | 427/54.1 |
| 4,199,421 | 4/1980 | Kamada et al. | |

*Primary Examiner*—John H. Newsome

[57] ABSTRACT

A process for producing a shaped resin article having a mat surface is disclosed.

In the process, a shaped resin article is coated with an acrylic coating composition comprised of a (meth)acrylic acid ester polymer, a polyfunctional monomer containing at least two (meth)acryloyloxy groups in one molecule and, if necessary, an organic solvent, irradiated with ultraviolet rays, and then treated with a treating agent.

2 Claims, No Drawings

PROCESS FOR PRODUCING A SHAPED ARTICLE HAVING A MAT SURFACE

BACKGROUND OF THE INVENTION

1. Field of the Invention

The present invention relates to a process for producing a shaped resin article which has a uniform, frosted glass-like surface or mat pattern surface.

2. Description of Prior Art

Shaped resin articles made of polymethyl methacrylate, polystyrene or polycarbonate have been required, heretofore, to have a mat or decorative design surface when they are used as a material for light covers, decorative articles, signboards or name plates. Various methods for forming a mat or decorative design surface have been proposed. One method is to incorporate an inorganic filler, such as titanium oxide or cross-linked particles, into the shaped resin article, thereby to roughen the surface thereof. However, this method is disadvantageous in that the inorganic filler or cross-linked particles cause the mechanical strength of the shaped article to be reduced. In addition there has also been known a method for roughening a surface of a shaped article by subjecting the surface to an oxidizing treatment or a solvent treatment, a method for roughening a surface of a shaped article by subjecting the surface to a thermal or mechanical drawing treatment and a method for developing a decorative design on a surface of a shaped article by printing or laminating. However, all of these methods are disadvantageous in that they cause the process to be complicated and are accompanied by a reduction in the mechanical strength of the substrate. Accordingly, these methods were not always satisfactory. In comparison with glass, which is a primary competitive material in the field of optical applications and design applications, it was very difficult to develop a frosted glass-like feel on a surface of a shaped resin article.

BRIEF SUMMARY OF THE INVENTION

In view of the above, extensive studies have been conducted to develop a frosted glass-like feel on a surface of a shaped resin article. As a result, it has been found that by irradiating a surface of a shaped resin article with ultraviolet rays under particular conditions, it is possible to develop a mat or design having a frosted glass-like feel on the surface in a relatively convenient process without causing a reduction in the mechanical strength of the article.

That is, the present invention provides a process for producing a decorative shaped article having a mat surface which comprises: coating a surface of a shaped resin article with a uniform acrylic coating composition comprised of an acrylic or methacrylic ester polymer, a polyfunctional monomer containing at least two acryloyloxy or methacryloyloxy groups per molecule and, if necessary, an organic solvent; irradiating the coated surface with ultraviolet rays, and; treating the irradiated surface with a treating agent.

It is known that, when a surface of a shaped synthetic resin article is irradiated with active energy rays, such as ultraviolet rays, the physical property of the article itself is degraded. It is also known that when the irradiated article is treated with a solvent, the surface of the article is whitened. In such cases, cracks occur in the article itself, which results in a reduction in the mechanical strength of the article. In addition, the distribution of the solvent cracks is not uniform, which renders the treated article unsuitable for design applications. In contrast, when a shaped resin article coated with a particular acrylic composition which is a feature of the present invention is irradiated with ultraviolet rays and, then, coated with an organic solvent or a particular hardening liquid, it is possible to form a uniform and unique frosted glass-like mat surface on the article without causing the mechanical strength to be reduced.

DETAILED DESCRIPTION OF THE INVENTION

The process of the present invention is applicable to any conventional shaped resin article. Examples of such a shaped resin article are those made of a thermoplastic resin such as methyl methacrylate homo-, or copolymer polystyrene, styrene-acrylonitrile copolymer, polyester, polycarbonate, polyvinyl chloride and ABS resin, and those made of a thermosetting resin such as epoxy resin and polyallyldiglycolcarbonate resin.

The acrylic coating composition to be applied onto a surface of a shaped article is a mixture comprised of a polymer consisting mainly of an acrylic or methacrylic acid ester and a polyfunctional monomer containing at least two acryloyloxy or methacryloyloxy groups. If necessary, an organic solvent capable of uniformly dissolving these components may be used. Suitable examples of the acrylic or methacrylic acid ester are methyl acrylate or methacrylate, ethyl acrylate or methacrylate, and butyl acrylate or methacrylate. A polymer of these acrylic or methacrylic acid esters may be used as a homopolymer or copolymer. Among these, a copolymer comprised of methyl methacrylate and ethyl acrylate or methacrylate, or butyl acrylate or methacrylate, is particularly preferable from a standpoint of adherence to the substrate. Even if a shaped resin article coated with the acrylic or methacrylic acid ester polymer alone is irradiated with ultraviolet rays and post-treated, a uniform translucent product cannot be obtained. It is essential that the acrylic or methacrylic acid ester polymer be used in admixture with a polyfunctional monomer containing at least two acryloyloxy or methacryloyloxy groups. Suitable examples of the polyfunctional monomer are pentaerythritol triacrylate, pentaerythritol tetracrylate, dipentaerythritol tetraacrylate, dipentaerythritol hexaacrylate, trimethylolpropane triacrylate, pentaglycerol triacrylate, polyethylene glycol diacrylate, 1,4-butanediol diacrylate, 2,2-bis(4-acryloxydiethoxyphenyl) propane and the methacrylates thereof. The use of a difunctional monomer containing two acryloyloxy or methacryloyloxy groups can produce a mat surface. However, it is more preferable to use a polyfunctional monomer containing at least three acryloyloxy or methacryloyloxy groups from a standpoint of uniformity and frosted glass-like feel. A monomer containing one acryloyloxy or methacryloyloxy group or other vinyl monomer such as styrene can provide little mat surface. It is to be understood that such a monomer may be used in combination with a polyfunctional monomer containing at least three acryloyloxy or methacryloyloxy groups in one molecule.

The mixing ratio of the acrylic or methacrylic acid ester polymer to the polyfunctional monomer may vary depending upon the desired degree of mat of the final product and the desired feel thereof. However, when the amount of the polyfunctional monomer is too large or too small, there is a tendency for the translucency effect to become insufficient. For this reason, it is preferable that the weight ratio of the polyfunctional monomer to the acrylic or methacrylic acid ester polymer be in the range of from 1:5 to 2:3. Because these acrylic compositions usually have a high viscosity, an organic solvent capable of uniformly dissolving these compositions may be used to adjust the viscosity of the compositions. The organic solvent may be suitably selected from those which are capable of uniformly dissolving the composition, but not capable of dissolving the shaped article to be treated to an extreme extent. Examples of such an organic solvent are aromatic hydrocarbons such as benzene and toluene; ketones such as acetone and methyl ethyl ketone; ethers such as dioxane, and; esters such as ethyl acetate and ethyl propinate. An organic solvent having a boiling point of from 50° to 200° C. under atmospheric pressure is preferable. In addition, from a standpoint of enhanced adherence between the substrate to be treated and the coating applied thereon, it is preferable that the organic solvent dissolve the substrate to an appropriate degree. However, in the case where the dissolving power of the organic solvent is so strong as to cause the solvent-whitening of the substrate, the organic solvent may be used in combination with a solvent having a poor dissolving power, provided that the dissolution of the acrylic coating composition is not hindered. Examples of a solvent having a poor dissolving power are alcohols such as isopropanol, isobutanol and diacetone alcohal. The substrate may be coated with the acrylic coating composition by a conventional procedure, such as, for example, brushing, roller coating, rotary coating, spray coating or dip coating. The acrylic composition applied onto the substrate has a thickness of from 1 to 20 microns after the composition is coated.

The shaped article coated with the acrylic composition is irradiated with ultraviolet rays from a light source, such as a xenon lamp, a low pressure mercury lamp and a high pressure mercury lamp. In this case, other active energy rays, such as electron rays and gamma-rays, may also be applied. However, ultraviolet rays are preferable from a convenience point of view. The irradiation condition may be suitably varied depending upon the desired degree of mat of the shaped article and the desired feel thereof. Prolonged irradiation at a very high output may cause the shaped article to be degraded or deformed. Accordingly, such an irradiation is unfavourable.

The shaped article irradiated with ultraviolet rays is further treated with a treating agent comprised mainly of a polyfunctional monomer containing at least three acryloyloxy or methacryloyloxy groups in one molecule, by applying it onto the irradiated surface of the shaped article. The coating method mentioned above can be used for applying the treating agent. Thus, a uniform, frosted glass-like mat surface is formed on the shaped article. The organic solvent used for this purpose includes alcohols such as methyl alcohol and ethyl ahcohol; ketones such as acetone and methyl ethyl ketone, and; aromatic hydrocarbons such as benzene and toluene. Alcohols are suitable for a relatively light degree of mat, while ketones and aromatic hydrocarbons are suitable for an intense degree of mat. The treatment by the organic solvent may be carried out at room temperature for several minutes. This treated article may be used as a decorative shaped article. Because of its roughness, the surface of the treated article exhibits poorer wear resistance and has a poorer resistance to scratching than those of the surfaces of conventional shaped resin articles. Accordingly, such an article is often inferior with respect to the durability of a design appearance. In this regard, when the shaped article irradiated with ultraviolet rays is coated with the above-mentioned particular hardening liquid, instead of the treatment by the organic solvent, and then, the coated article is again irradiated with ultraviolet rays to harden the coating, the resulting decorative article exhibits excellent wear resistance. The hardening treatment improves not only the wear resistance of the article but, also the uniformity of the mat appearance and the frosted glass-like feel. Accordingly, this treatment exhibits unique effects which are very advantageous for the decorative shaped article.

The hardening liquid usable for the present invention contains, as a primary component, a polyfunctional monomer containing at least three acryloyloxy or methacryloyloxy groups in one molecule. Examples of the polyfunctional monomer are those which are used in the above-mentioned acrylic coating composition. Among these, pentaerythritol and polypentaerythritol polyacrylate or polymethacrylate monomers are preferable from a standpoint of air-hardening property. The hardening liquid may contain a difunctional or monofunctional monomer and/or an organic solvent in order to impart flexibility and adherence to the resulting hardened film or to adjust the viscosity of the liquid. In addition, a photosensitizer may be added to the hardening liquid in order to increase the hardening rate or hardness of the coating. The thickness of a hardened film deposited on the surface of the shaped article is satisfactory if it is in the range of from 1 to 20 microns.

In the practice of the present invention, when the shaped article coated with the acrylic composition is irradiated with ultraviolet rays through a designed original, such as a metallic plate or printing film having a design punched therein, a unique design is developed on the surface of the article. The so-treated article is of a high design value.

The present invention will be illustrated in more detail by the following examples.

EXAMPLES 1 THROUGH 4 AND COMPARATIVE EXAMPLES 1 THROUGH 3

A polycarbonate sheet having a thickness of 2 mm was immersed in each of various acrylic coating compositions shown in Table-1, thereby to deposit a coating having a thickness of 5 microns on the surface of the sheet. The coated sheet was irradiated with ultraviolet rays from a 2 KW high pressure mercury lamp for 13 seconds. After the irradiation, the sheet was immersed in a hardening liquid comprised of 30 parts of dipentaerythritol tetraacrylate, 10 parts of tetrahydrofurfuryl acrylate, 50 parts of isopropanol, 10 parts of isobutanol and 1 part of benzoin isopropyl ether, thereby to deposite a coating on the surface of the sheet. Then, the sheet was irradiated with ultraviolet rays for 10 seconds to obtain a hardened film of 3 microns. The resulting sheet had a uniform, frosted glass-like mat surface. Even if the surface was strongly rubbed with #000 steel wool, few scratches were observed. The sheet had a bending strength of the same level as that of the original polycarbonate.

For comparison purposes, the same polycarbonate sheet coated with no acrylic coating composition (comparative Examples 1 and 2) and the same polycarbonate sheet coated with an methacrylic acid ester polymer only (Comparative Example 3) were subjected to the same treatments described above. The results are shown in Table 1. The former had a non-uniform mat and a poor bending strength, and the latter had substantially no mat and thus, they were unsuitable.

unique feel, while the acrylic composition (Example 9) into which a difunctional monomer, i.e., tetraethylene glycol dimethacrylate, was incorporated, provided a slightly low degree of mat and a relatively rough feel.

TABLE 1

| | Acrylic composition*1 | Surface condition | Bending strength*2 (kg/cm²) | Wear resistance*3 | Remarks |
|---|---|---|---|---|---|
| Comp. Ex. 1 | — | — | 1050 | little scratch occurs | Coating of the acrylic composition and irradiation of ultraviolet rays are not carried out, only hardening liquid is coated |
| Comp. Ex. 2 | — | The upper portion is transparent, the lower portion is opaque cracked and non-uniform | 860 | little scratch occurs | Irradiation of ultraviolet rays is carried out without coating the acrylic composition, and then, hardening liquid treatment is carried out |
| Comp. Ex. 3 | MMA-EMA-BA copolymer*4 15 parts, toluene 35 parts, isobutanol 35 parts, diacetone alcohol 15 parts | The upper portion is transparent, the lower portion is slightly translucent and non-uniform | 1039 | little scratch occurs | Acrylic compositon containing no polyfunctional monomer is used |
| Example 1 | MMA-EMA-BA copolymer*4 15 parts, toluene 35 parts, isobutanol 30 parts, diacetone alcohol 15 parts, 2P5A 5 parts | Uniform, frosted glass-like mat surface | 1045 | little scratch occurs | — |
| Example 2 | EMA-BMA copolymer 15*5 15 parts, xylene 35 parts, isobutanol 45 parts, 2P5A 5 parts | Uniform, frosted glass-like mat surface | 1055 | little scratch occurs | — |
| Example 3 | polymer 15 parts xylene 45 parts, isobutanol 35 parts, 2P5A 5 parts | Uniform, frosted glass-like mat surface | 1048 | little scratch occurs | — |
| Example 4 | MMA-BA copolymer 15*6 parts, toluene 35 parts, isobutanol 35 parts diacetone alcohol 15 parts | Uniform, frosted glass-like mat surface | 1040 | little scratch occurs | — |

Note:
*1MMA: methyl methacrylate
EMA: ethyl methacrylate
BA: butyl acrylate
BMA: butyl methacrylate
2P5A: dipentaerythritol pentaacrylate
*2Measured according to ASTMD 790
*3Evaluated by a strong rubbing with #000 steel wool
*4Composition of MMA-EMA-BA copolymer (unit: % by weight) MMA 60, EMA 20, BA 20
*5Composition of EMA-BMA copolymer (unit: % by weight) EMA 60, BMA 40
*6Composition of MMA-BA copolymer (unit: % by weight) MMA 40, BA 60

EXAMPLES 5 THROUGH 9

The same procedures as those described in Example 1 were repeated, except that the type and amount of the polyfunctional monomer to be incorporated into the acrylic coating composition of Example 1 were varied as shown in Table 2. The acrylic composition into which the polyfunctional monomer containing at least three acryloyloxy groups was incorporated provided a uniform, translucent, frosted glass-like mat having a

TABLE 2

| | Polyfunctional monomer contained in acrylic compositon | | |
|---|---|---|---|
| | Type | Amount (part) | Surface condition |
| Example 5 | Dipentaerythritol tetraacrylate | 3 | Uniform frosted glass-like mat surface |
| Example 6 | Dipentaerythritol tetraacrylate | 10 | Uniform frosted glass-like mat surface |
| Example 7 | Pentaerythritol triacrylate | 5 | Uniform frosted glass-like mat surface |
| Example 8 | Pentaerythritol tetraacrylate | 5 | Uniform frosted glass-like mat surface |
| Example 9 | Tetraethylen glycol dimethacrylate | 5 | Relatively rough, frosted glass-like surface having a poor mat |

EXAMPLE 10

The same procedures as those described in Example 1 were repeated, except that instead of the polycarbonate sheet, a polymethyl methacrylate sheet, a polystyrene injection moulded plate, a polystyrene-acrylonitrile injection moulded plate and a polyethylene terephthalate injection moulded plate, which materials each had a thickness of 2 mm, were used. All the substrates produced a decorative shaped article having a uniform, frosted glass-like mat surface, irrespective of their types.

EXAMPLES 11 THROUGH 15

Following a procedure similar to that described in Example 1, a polycarbonate sheet having a thickness of 2 mm was coated with the acrylic composition, and then, irradiated with ultraviolet rays. Then, the sheet was immersed in the various organic solvents shown in Table 3, at normal temperature, for two minutes, and then, dried. In all the cases, the sheet exhibited a uniform, frosted glass-like mat surface.

TABLE 3

| | Organic solvent | Surface condition |
|---|---|---|
| Example 11 | Methyl alcohol | Slightly mat, uniformly frosted glass-like appearance |
| Example 12 | Isopropanol | Slightly mat, uniformly frosted glass-like appearance |
| Example 13 | Methyl ethyl ketone | Remarkably mat, uniformly frosted glass-like appearance |
| Example 14 | Benzene | Remarkably mat, uniformly frosted glass-like appearance |
| Example 15 | Toluene | Remarkably mat, uniformly frosted glass-like appearance |

We claim:

1. A process for producing a shaped article having a uniform mat surface which comprises: coating a surface of a shaped resin article with an acrylic coating composition comprising an acrylic or methacrylic ester polymer, and a polyfunctional monomer containing at least two acryloyloxy or methacryloyloxy groups per molecule; irradiating the coated surface with ultraviolet rays, and; further, coating the irradiated surface with a hardening liquid comprising mainly a polyfunctional monomer containing at least three acryloyloxy or methacryloyloxy groups per molecule, and; irradiating the further coated surface with ultraviolet rays.

2. A process as claimed in claim 1, wherein said acrylic coating composition further contains an organic solvent.

* * * * *

UNITED STATES PATENT AND TRADEMARK OFFICE
CERTIFICATE OF CORRECTION

PATENT NO. : 4,323,592

DATED : April 6, 1982

INVENTOR(S) : Isoa Sasaki et. al.

It is certified that error appears in the above—identified patent and that said Letters Patent is hereby corrected as shown below:

On the title page insert the following:

[73] -- Assignee: MITSUBISHI RAYON COMPANY, LIMITED, Tokyo, Japan --

-- Attorney, Agent, or Firm - Oblon, Fisher, Spivak, McClelland & Maier, P.C. --

Signed and Sealed this

Twenty-ninth Day of June 1982

[SEAL]

Attest:

GERALD J. MOSSINGHOFF

Attesting Officer

Commissioner of Patents and Trademarks